United States Patent
Kamperschroer et al.

(10) Patent No.: US 6,625,443 B1
(45) Date of Patent: Sep. 23, 2003

(54) METHOD FOR THE USER-CONTROLLED RELEASE OF WIRELESS TELECOMMUNICATIONS CONNECTIONS IN WIRELESS TELECOMMUNICATIONS SYSTEMS, ESPECIALLY DECT SYSTEMS

(75) Inventors: Erich Kamperschroer, Hamminkeln (DE); Bernhard Slonina, Dortmund (DE); Michael Beckers, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,945

(22) PCT Filed: Aug. 18, 1998

(86) PCT No.: PCT/DE98/02404

§ 371 (c)(1),
(2), (4) Date: Mar. 2, 2000

(87) PCT Pub. No.: WO99/12361

PCT Pub. Date: Mar. 11, 1999

(30) Foreign Application Priority Data

Sep. 2, 1997 (DE) ......................................... 197 38 339

(51) Int. Cl.[7] ............................................... H04M 3/42
(52) U.S. Cl. ...................... 455/414; 455/462; 455/528; 455/555; 455/563
(58) Field of Search ................................. 455/462, 422, 455/411, 414, 456, 403, 434, 555, 563, 528; 379/88, 207.02, 207.03, 207.04, 207.06

(56) References Cited

U.S. PATENT DOCUMENTS

| | | | | |
|---|---|---|---|---|
| 5,042,063 A | * | 8/1991 | Sakanishi et al. | 379/88 |
| 5,535,429 A | | 7/1996 | Bergenlid et al. | |
| 5,956,635 A | * | 9/1999 | Hoogerwerf et al. | 455/411 |
| 5,995,842 A | * | 11/1999 | Johnson | 455/462 |
| 6,112,080 A | * | 8/2000 | Anderson et al. | 455/422 |
| 6,157,848 A | * | 12/2000 | Bareis et al. | 455/563 |
| 6,205,328 B1 | * | 3/2001 | Lantto et al. | |
| 6,259,906 B1 | * | 7/2001 | Carlsson et al. | 455/403 |
| 6,349,212 B1 | * | 2/2002 | Martensson et al. | 455/462 |
| 6,389,292 B2 | * | 5/2002 | Biedermann | 455/462 |
| 6,400,949 B1 | * | 6/2002 | Bielefeld et al. | 455/434 |
| 6,405,033 B1 | * | 6/2002 | Kennedy, III et al. | 455/414 |
| 6,438,380 B1 | * | 8/2002 | Bi et al. | 455/456 |

FOREIGN PATENT DOCUMENTS

| | | |
|---|---|---|
| DE | 40 08 598 A1 | 9/1991 |
| DE | 195 33 541 C1 | 3/1997 |
| DE | 197 19 163 A1 | 11/1998 |
| EP | 0 627 864 A2 | 12/1994 |

* cited by examiner

Primary Examiner—Dwayne Bost
Assistant Examiner—Ronald J. Ward
(74) Attorney, Agent, or Firm—Bell, Boyd & Lloyd LLC (57) ABSTRACT

In order to trigger user-controlled release of wireless telecommunication connections in wireless telecommunication systems particularly DECT systems, in user-friendly and acceptable fashion, connections that have once been setup between telecommunication devices which are connectible by wireless telecommunication in wireless telecommunication systems—for example, DECT mobile parts and DECT base stations in DECT systems—are released in two stages by operating procedures differing from those for the connection setup.

15 Claims, 7 Drawing Sheets

METHOD FOR THE USER-CONTROLLED RELEASE OF WIRELESS TELECOMMUNICATIONS CONNECTIONS IN WIRELESS TELECOMMUNICATIONS SYSTEMS, ESPECIALLY DECT SYSTEMS

BACKGROUND OF THE INVENTION

1. Field of the Invention

The present invention is directed to a method for user-controlled release of wireless telecommunication connections in wireless telecommunication systems, particularly DECT systems.

2. Description of the Related Art

In message systems having a message transmission link between a message source and a message sink, transmission and reception devices are employed for message processing and transmission, whereby 1) the message processing and message transmission can ensue in a privileged transmission direction (simplex mode) or in both transmission directions (duplex mode);
2) the message processing is analog or digital;
3) the message transmission ensues wirelessly via the remote transmission link on the basis of various message transmission methods FDMA (frequency division multiple access), TDMA (time division multiplex access) and/or CDMA (code division multiple access)—for example according to radio standards such as DECT, GSM, WACS or PACS, IS-54, IS-95, PHS, PDC, etc. [see IEEE Communications Magazine, January 1995, pages 50–57, D. D. Falconer et al, "Time Division Multiple Access Methods For Wireless Personal Communications"]—and/or ensues wire-bound.

"Message" is a higher-ranking term that stands both for the meaningful content (information) as well as for the physical representation (signal). Despite the same meaningful content of a message—i.e., the same information—different signal forms can occur. Thus, for example, a message directed to a subject can be transmitted (1) in the form of an image,
(2) as a spoken word,
(3) as a written word,
(4) as an encrypted word or image.

The transmission mode according to the above forms (1) . . . (3) is thereby normally characterized by continuous (analog) signals, whereas discontinuous signals (for example, pulses, digital signals) usually arise in the transmission according to the foregoing form (4).

Proceeding on the basis of this general definition of a message system, the invention is directed to a method for user-controlled release of wireless telecommunication connections in wireless telecommunication systems, particularly DECT systems.

Telecommunication systems of the species defined above are, for example DECT systems [digital enhanced (earlier: European) cordless telecommunication; see (1): Nachrichtentechnik Elektronik 42 (1992) January/February, No. 1, Berlin, Del.; U. Pilger "Struktur des DECT-Standards", pages 23 through 29 in conjunction with ETSI publication ETS 300175-1 . . . 9, October 1992; (2): Telcom Report 16 (1993), No.1, J. H. Koch: "Digitaler Komfort für schnurlose Telekommunikation—DECT-Standard eröffnet neue Nutzungsgebiete", pages 26 and 27; (3): tec 2/93—the technical magazine of Ascom, "Wege zur universellen mobilen Telekommunikation", Pages 35 through 42; (4): Philips Telecommunication Review, Vol. 49, No. 3, September 1991, R. J. Mulder: "DECT, a universal cordless access system"; (5): WO 93/21719 (FIGS. 1 through 3 with appertaining description)] or GAP systems (Generic Access Profile; ETSI publication ETS 300444, December 1995, ETSI, FR) that, for example, can be constructed according to the illustration in FIG. 1. The GAP standard is a sub-set of the DECT standard which assigned the task of assuring the inter-operability of the DECT air interface for telephone applications.

Figure 1:
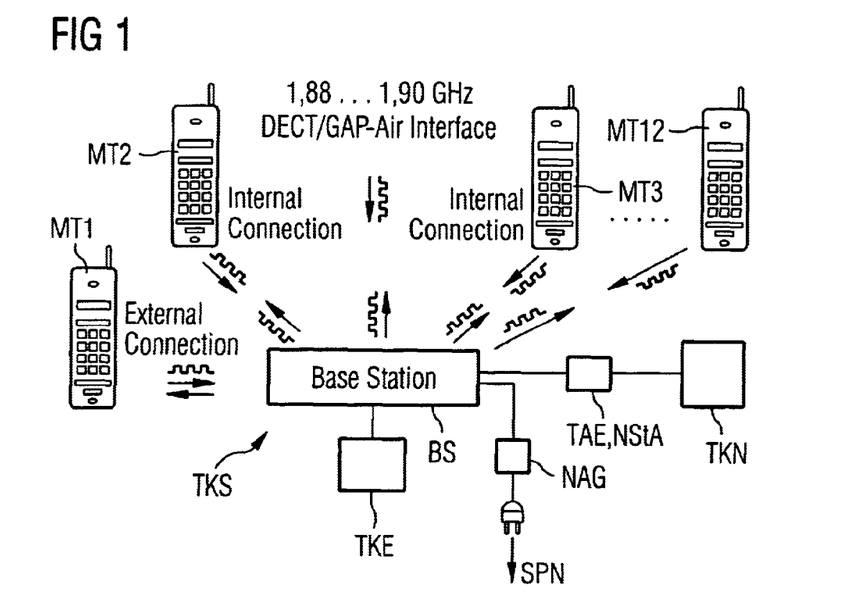
FIG. 1 is a schematic diagram of a telecommunications system.

According to the DECT/GAP standard and the illustration in FIG. 1, a maximum of twelve connections can be set up in parallel to DECT/GAP mobile parts MT1 . . . MT12 at a DECT/GAP base station BS over a DECT/GAP air interface designed for the frequency range between 1.88 and 1.90 GHz, being set up according to the TDMA/FDMA/TDD method (Time Division Multiple Access/Frequency Division Multiple Access/Time Division Duplex). The number 12 derives from a plurality "k" of time slots or, respectively, telecommunication channels (k=12) available for the duplex mode of a DECT/GAP system. The connections can thereby be internal and/or external. Given an internal connection, two mobile parts, for example, the mobile part MT2 and the mobile part MT3, that are registered at the base station BS can communicate with one another. For a setup of an external connection, the base station BS is connected to a telecommunication network TKN, for example in line-bound form via a telecommunication terminal unit TAE or, respectively, a private branch exchange NSTA with a line-bound telecommunication network or, according to the published PCT patent application WO 95/05040, in wireless form as a repeater station with a higher-ranking telecommunication network. Given the external connection, communication can be carried out with a mobile part, for example with the mobile part MT1, via the base station BS, the telecommunication terminal unit TAE or, respectively, private branch exchange NSTA, communication being carried out with a subscriber in the telecommunication network TKN. When the base station BS—as in the case of the Gigaset 951 (Siemens cordless telephone, see Telcom Report 16, (1993) No. 1, pages 26 and 27)—has only one connection to the telecommunication terminal unit TAE or, respectively, the private branch exchange NSTA, then only one external connection can be setup. When the base station BS—as in the case of the Gigaset 952 (Siemens Cordless Telephone; see Telcom Report 16 (1993), No. 1 pages 26 and 27)—has two connections to the telecommunication network TKN, then a further external connection from a line-bound telecommunication terminal equipment TKE connected to the base station BS is possible in addition to the external connection to the mobile part MT1. It is thereby also fundamentally conceivable that a second mobile part, for example, the mobile part MT12, uses the second connection for an external connection instead of the telecommunication terminal equipment TKE. Whereas the mobile parts MT1 . . . MT12 are operated with a battery or an accumulator, the base station BS fashioned as a cordless, small-scale exchange is connected to a voltage network SPN via a network connection means NAG.

Figure 2:
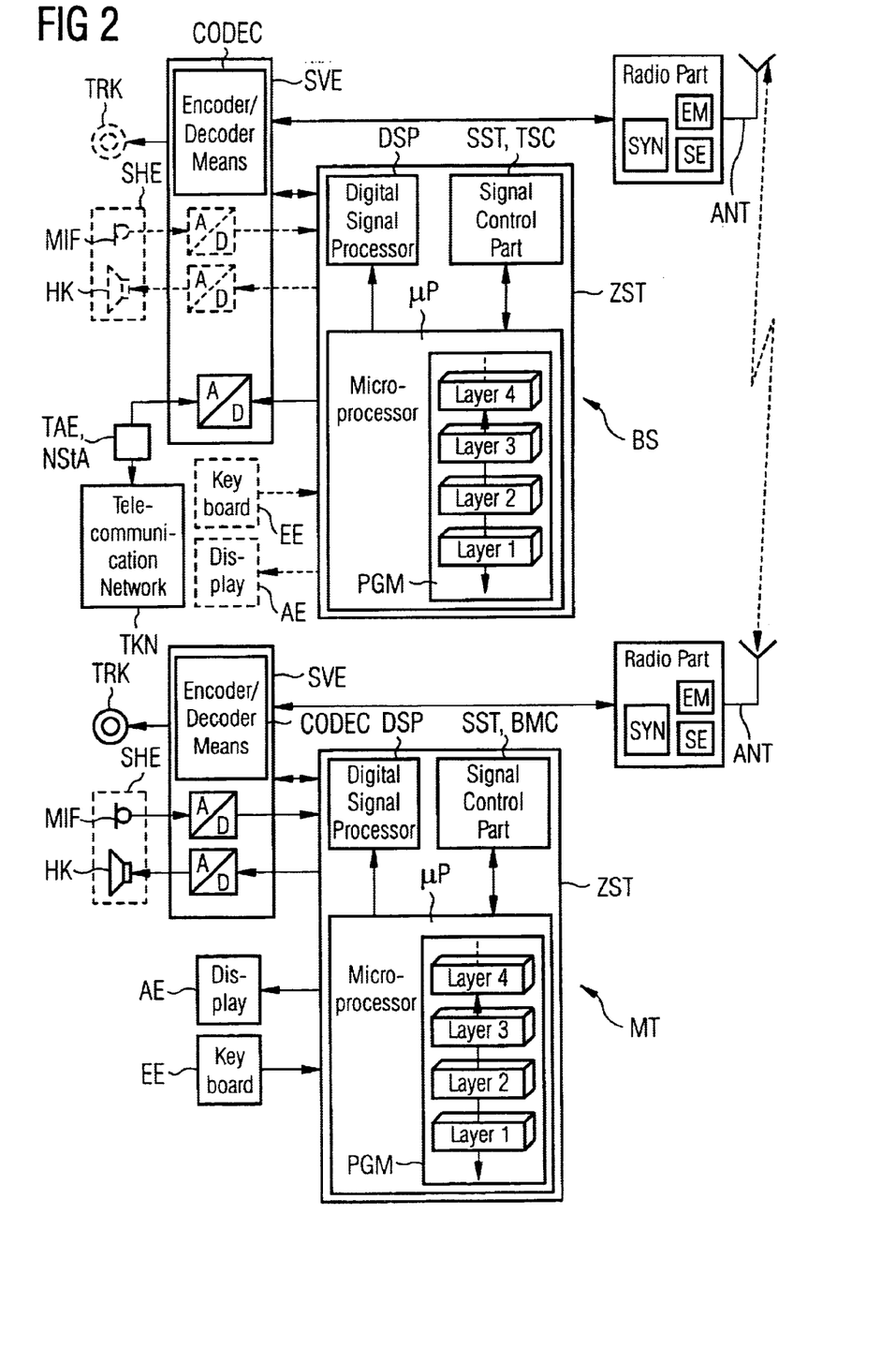
FIG. 2 is a functional block diagram of the fundamental circuit structure of the base station and of the mobile part.

Proceeding from the publication components 31 (1993), No. 6, pages 215 through 218, S. Althammer, D. Brückmann, "Hochoptimierte IC's für DECT-Schnurlostelefone", FIG. 2 shows the fundamental circuit structure of the base station BS and of the mobile part MT. The base station BS and the mobile part M2 accordingly comprise a radio part FKT with an antenna allocated for the transmission and reception of radio signals, a signal processing means SVE and a central controller ZST that are connected to one another in the illustrated way. It is essentially the known devices such as transmitter SE, receiver EM and synthesizer SYN that are contained in the radio part FKT. Among other things, the signal processing means SVE contains an encoding/decoding means CODEC. The central controller ZST comprises a microprocessor µP both for the base station BS as well as for the mobile part MT, the microprocessor µP having a program module PGM constructed according to the OSI/ISO layer model (see (1): Unterrichtsblätter—Deutsche Telekom, Vol. 48, 2/1995, pages 102 through 111; (2): ETSI Publication ETS 300175-1 ... 9, October 1992], a signal control part SST and a digital signal processor DSP that are connected to one another in the illustrated way. Of the layers defined by the layer model, only the first four layers which are immediately critical for the base station BS and the mobile part MT are shown. The signal control part SST is implemented in the base station BS as a time switch controller TSC and is implemented in the mobile part MT as a burst controller BMC. The critical difference between the two signal control parts TSC, BMC is comprised therein that the base station-specific signal control part TSC assumes additional switching functions compared to the mobile part-specific signal control part BMC.

The basic functioning of the circuit units recited above is described, for example, in the above-cited publication components 31 (1993), No. 6, pages 215 through 218.

At the base station BS and the mobile part MT, the described circuit structure according to FIG. 2 is supplemented by additional function units in conformity with their function in the DECT/GAP system of FIG. 1.

The base station BS is connected via the signal processing means SVE and the telecommunication terminal unit TAE or, respectively, the private branch exchange NSTA, being connected to the telecommunication network TKN. As an option, the base station BS can also comprise a user interface (function units entered with broken lines in FIG. 2) that, for example, is composed of an input means EE fashioned as keyboard, of a display means AE fashioned as display, a speaking/listening means SHE fashioned as handset with microphone MIF and earphone HK as well as a call tone bell TRK.

The mobile part MT comprises the user interface possible as option at the base station BS with the above-described operating elements belonging to this user interface.

Figure 3:
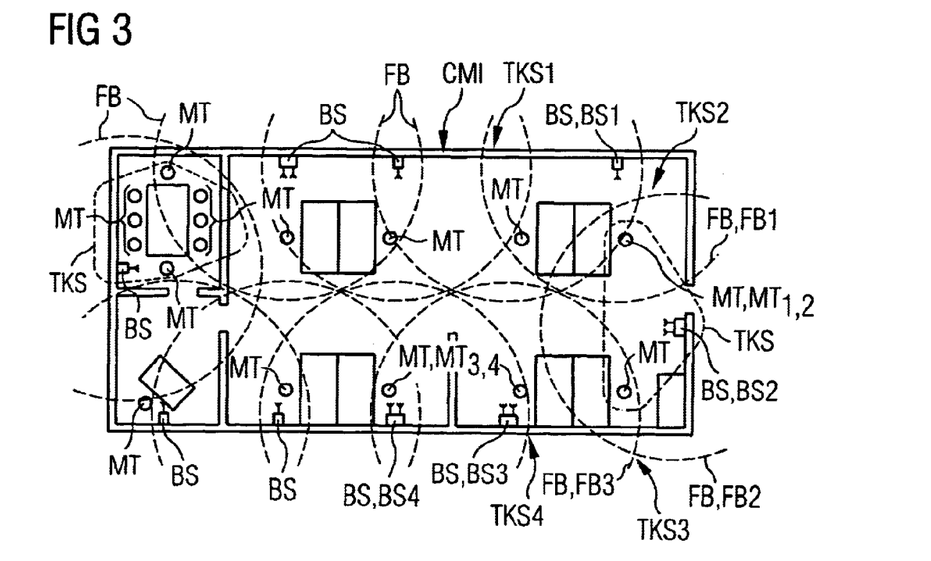
FIG. 3 is a diagram of a cellular DECT/GAP multi-system.

FIG. 3, proceeding from the DECT system according to FIG. 1, shows a cellular DECT/GAP multi-system CMI (cordless multicell integration) wherein a plurality of the above-described DECT/GAP systems TKS each respectively having a base station BS and one or more mobile parts MT are present at an arbitrary geographical location, for example concentrated in an administration building with large-scale offices—in the sense of a "hot spot" arrangement. Instead of a "closed" geographical location like the administration building, however, an "open" geographical location with strategic telecommunication significance is also possible for the installation of a cellular DECT/GAP multi-system CMI, for example plazas in large cities having a high traffic volume, a high accumulation of commercial units and great movement of people. Some of the base stations BS arranged in the large-scale office, differing from the base stations shown in FIGS. 1 and 2, are thereby fashioned according to published PCT patent application WO 94/10764 as antenna diversity base stations. The concentration of the DECT/GAP system TKS is thereby configured such (gap-free radio coverage of the geographical location) that individual DECT/GAP systems TKS work in the same environment due to the overlapping, cellular DECT/GAP radio areas FB.

Dependent on the degree of overlap, the same environment can thereby mean that a) a first base station BS1 of a first telecommunication system TKS1 is arranged in a first radio area FB1 and a second base station BS2 of a second telecommunication system TKS2 is arranged in a second radio area FB2 and can set up telecommunication connections to at least one mobile part $MT_{1,2}$;

b) a third base station BS3 of a third telecommunication system TKS3 and a fourth base station BS4 of a fourth telecommunication system TKS4 are arranged in a shared, third radio area FB3 and can set up telecommunication connections to at least one mobile part $MT_{3,4}$.

The cordless telecommunication scenario shown in FIGS. 1 through 3, wherein DECT mobile parts can be connected via a DECT air interface to a private (residential) DECT base station (FIG. 1) or, respectively, to one or more private or public DECT base station (FIG. 3), can then be expanded according to the publication "presentation of A. Elberse, M. Barry, G. Fleming on the subject, "DECT Data Services— DECT in Fixed and Mobile Networks", Jun. 17/18, 1996, Hotel Sofitel, Paris; Pages 1 through 12 and summary, to the effect that the DECT mobile parts are connectible via the DECT air interface to private and public DECT base stations.

According to published PCT patent application WO95/ 05040 (see FIGS. 3 through 8 therein with the respectively appertaining description), this scenario can then in turn be expanded in view of a universal mobile telecommunication system (UMTS) to the effect that pico-cell-related cordless telecommunication systems (for example, the previously discussed DECT systems from CTM points of view (cordless terminal mobility; CETSI Publications (1): "IN Architecture and Functionality for the support of CTM", Draft Version 1.10, September 1995; (2): "Cordless Terminal Mobility (CTM)—Phase 1, Service Description", draft DE/NA-010039, Version 6, Oct. 2, 1995) be linked into a higher-ranking network INFRA structure (for example, ISDN, PTSN, GSM and/or satellite networks) for accesses (see ETSI Publication, CTM Access Profile (CAP)", prETS 300824, November 1996). According to patent claim 1 of the PCT application WO95/05040, this can be achieved by a DECT base station fashioned as a DECT repeater. In a universal mobile telecommunication system, DECT is mainly understood as a "network access technology" for mobile communication services (see the presentation of A. Elberse, M. Barry, G. Fleming on the subject, "DECT Data Services—DECT in Fixed and Mobile Networks", Jun. 17/18, 1996, Hotel Sofitel, Paris; Pages 1 through 12 and summary) and not as a network.

Figure 4:
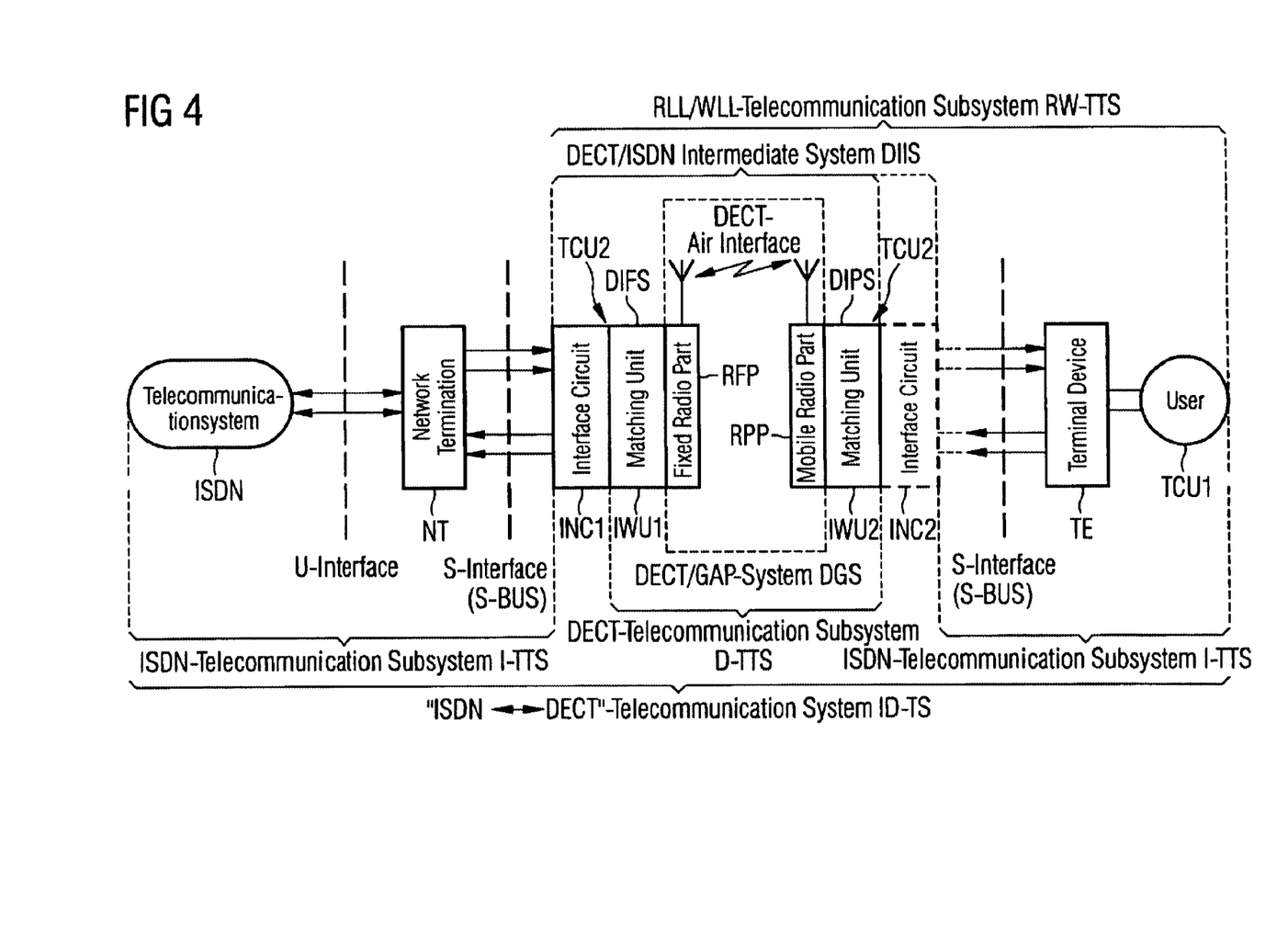
FIG. 4 is a block diagram of an ISDN ⇆DECT Telecommunication system with an ISDN telecommunication subsystem.

Standing for the scenario presented above, FIG. 4—proceeding from the publications "Nachrichtentechnik Elektronik", Berlin 45, (1995), No.1, Page 21 through 23 and No. 3, Pages 29 and 30, as well as IEE Colloqium 1993, 173; (1993), pages 29/1–29/7, W. Hing, F. Halsall: "Cordless access to the ISDN basic rate service" on the basis of a DECT/ISDN intermediate system DIIS according to ETSI Publication prETS -300822, February 1997—shows an ISDN⇋DECT" Telecommunication system ID-TS (Integrated Services Digital Network⇋Digital Enhanced Cordless Telecommunication) with an ISDN telecommunication sub-system I-TTS [see the publication "Nachrichtentechnik Elektronik", Berlin 41–43, Park: 1 through 10, T1: (1991) No. 3, pages 99 through 102; T2: (1991) No. 4, pages 138 through 143; T3: (1991) No. 5, Pages 179 through 182 and No. 6, pages 219 through 220; T4: (1991) No. 6, pages 220 through 222 and (1992) No. 1, pages 19 through 20; T5: (1992) No. 2, pages 59 through 62 and (1992) No. 3, pages 99 through 102; T6: (1992) No. 4, pages 150 through 153; T7: (1992) No. 6, pages 238 through 241; T8: (1993) No. 1, pages 29 through 33; T9: (1993) No. 2, pages 95 through 97 and (1993) No. 3, pages 129 through 135; T10: (1993) No. 4, pages 187 through 190] and a DECT telecommunication sub-system D-TTS.

As shall be explained in greater detail below, the DECT telecommunication sub-system D-TTS can thereby be a component part of a DECT/ISDN intermediate system DIIS or, respectively, of a RLL/WLL telecommunication sub-system RW-TTS. The DECT telecommunication sub-system D-TTS and, thus, the DECT/ISDN intermediate system DIIS or, respectively, the RLL/WLL telecommunication sub-system RW-TTS are preferably based on a DECT/GAP system GDS as shown, for example, in FIG. 1.

Alternatively, the DECT/ISDN intermediate system DIIS or, respectively, the RLL/WLL telecommunication sub-system RW-TTS can also be based on a GSM system (global system for mobile communication; see Informatik Spektrum 14 (1991) June, No. 3, Berlin, DE; A. Mann: "Der GSM-Standard —Grundlage für digitale europäische Mobilfunknetze", pages 137 through 152). Instead, it is also possible within the scope of a hybrid telecommunication system that the ISDN telecommunication system I-TTS is fashioned as a GSM system or as a PSTN system (public switched telecommunications network).

Coming into consideration over and above this as further possibilities for the realization of the DECT/ISDN intermediate system DIIS or, respectively, of the RLL/WLL telecommunication sub-system RW-TTS or of the ISDN telecommunication sub-system I-TTS of the initially cited systems as well as future systems that are based on known multiple access methods FDMA, TDMA, CDMA (Frequency Division Multiple Access, Time Division Multiple Access, Code Division Multiple Access) and hybrid multiple access methods formed therefrom.

The employment of radio channels (for example DECT channels) in classic line-bound telecommunication systems such as the ISDN (RLL/WLL scenario) is gaining increasingly in significance, particularly as viewed with the background of future, alternative network operators without their own complete wire network.

Given, for example, the RLL/WLL telecommunication sub-system RW-TTS, thus, the wireless connection technique RLL/WLL (radio in the local loop/wireless in the local loop) shall make ISDN services available to the ISDN subscriber at standard ISDN interfaces, for example upon involvement of the DECT system DS (see FIG. 4).

In the ISDN⇆DECT telecommunication system ID-TS according to FIG. 4, a first telecommunication subscriber (user) TCU1 (telecommunication user) has his terminal equipment TE (terminal endpoint; terminal equipment) linked into the ISDN world with the services available therein, for example, via a standardized S-interface (S-bus), the DECT/ISDN intermediate system DIIS fashioned as local message transmission loop—preferably DECT-specific and contained in the RLL/WLL telecommunication sub-system RW-TTS—a network termination NT, and a standardized U-interface of the ISDN telecommunication sub-system I-TTS and, second, a second telecommunication subscriber TCU2 is also linked into the ISDN world with the services available therein as ultimate user of the DECT/ISDN intermediate system DIIS.

The DECT/ISDN intermediate system DIIS is essentially composed of two telecommunication interfaces, of a first telecommunication interface DIFS (DECT intermediate fixed system) and of a second telecommunication interface DIPS (DECT intermediate portable system) that are wirelessly connected to one another, for example via a DECT air interface. Due to the quasi-location-bound, first telecommunication interface DIFS, the DECT/ISDN intermediate system DIIS forms the local message transmission loop defined above in this context. The first telecommunication interface DIIS contains a radio fixed part RFP, an interworking unit IWU1 and an interface circuit INC1 to the S-interface. The second telecommunication interface DIPS contains a radio portable RPP and an interworking unit IWU2 and, potentially, an interface circuit INC2 to the S-interface. The radio fixed part RFP and the radio portable RPP thereby form the known DECT/GAP system DGS.

As already mentioned, FIG. 4 shows, first, (first possibility), how the DECT/ISDN intermediate system DIIS is linked into the ISDN telecommunication sub-system I-TTS as local message transmission loop within the framework of the RLL/NLL telecommunication sub-system RW-TTS as typical RLL/WLL scenario and, second (second possibility), how the DECT/ISDN intermediate system DIIS is only connected to the ISDN telecommunication sub-system I-TTS at the network side as seen from GAP points of view (cordless terminal ability access profiles). Given the second possibility, the interface circuit INC2 of the second telecommunication interface DIPS to the S-interface is not active or is not present at all. In order to graphically present and support this situation overall, the interface circuit INC2 of the second telecommunication interface DIPS is shown with broken lines. Whereas the second telecommunication interface DIPS given the first possibility, for example, is not fashioned mobile part-specific, i.e. with a user interface, the second telecommunication interface DIPS in the second possibility is fashioned as a typical mobile part with a user interface.

Figure 5:
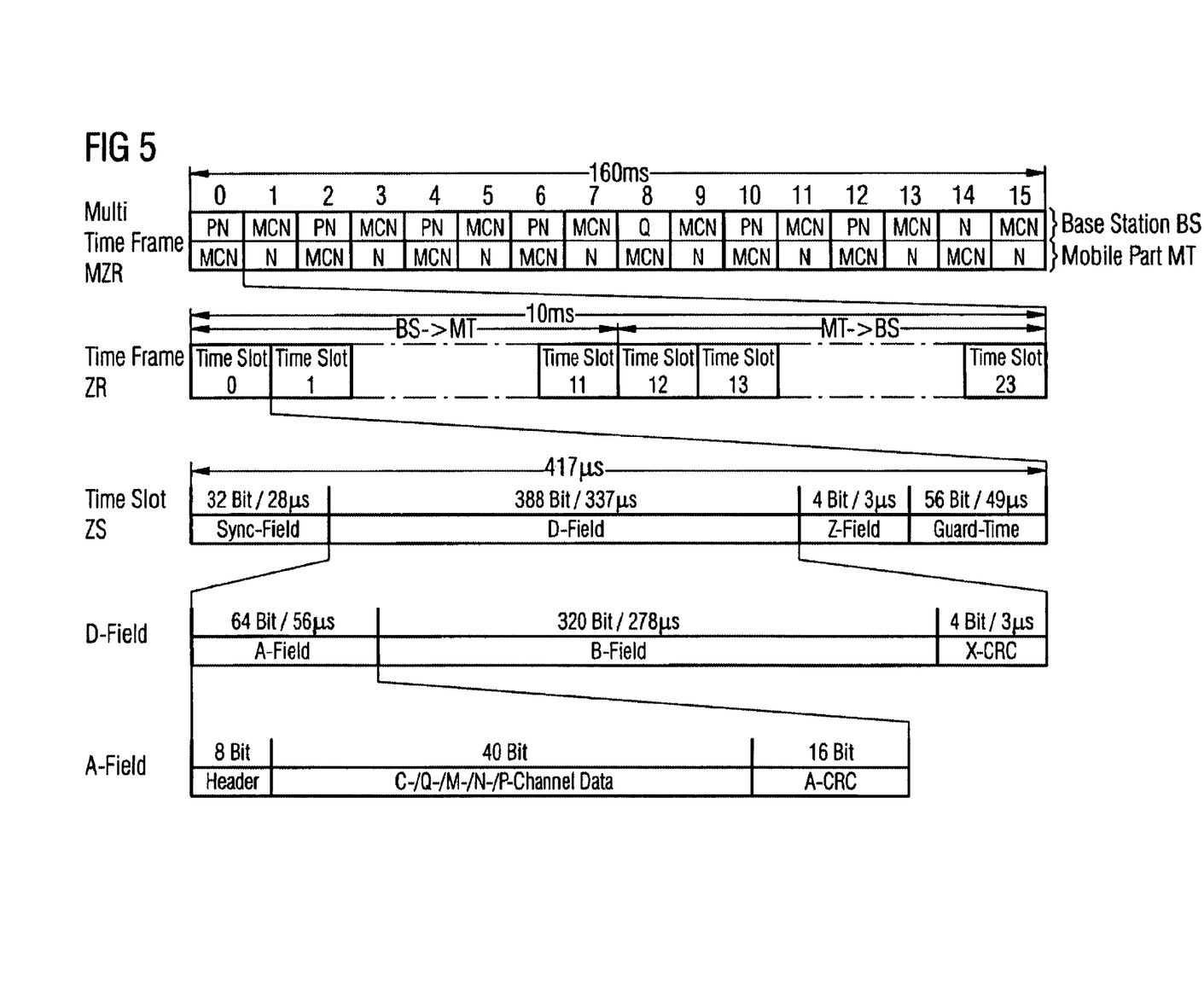
FIG. 5 is a collection of signal diagrams of the TDMA structure of the DECT/GAP system.

Based on the publication, "Nachrichtentechnik Elektronik" 42 (1992) January/February, No. 1, Berlin, Del. U. Pilger, "Struktur des DECT-Standards", pages 23 through 29 in conjunction with ETS 300 175-1 . . . 9, October 1992, FIG. 5 shows the TDMA structure of the DECT/GAP system DGS. The DECT/GAP system is a hybrid system with respect to the multiple access methods, whereby radio messages according to the TDMA principle according to FIG. 5 can be sent in a predetermined time sequence from the base station BS to the mobile part MT and from the mobile part MT to the base station BS (time division duplex mode) according to the FDMA principle on ten frequencies in the frequency band between 1.88 and 1.9 GHZ. The time sequence is thereby defined by a multi-time frame MZR that occurs every 160 ns and that comprises 16 time frames ZR each respectively having a time duration of 10 ms. Information that relate to a C, M, N, P, Q channel defined in the DECT standard are separately transmitted in this time frame ZR to the base station BS and mobile part MT. When information for a plurality of these channels are transmitted in one time frame ZR, then the transmission ensues according to a priority list with M>C>N and P>N. Each of the sixteen time frames ZR of the multi-time frame MZR is in turn divided into twenty-four time slots ZS, each having a respective time duration of 417 μs, each having a respective time duration 417 μs, whereof 12 times ZS (time slots 0 . . . 11) are intended for the transmission direction base station BS→mobile part MT and another 12 time slots ZS (time slots 12 . . . 23) are intended for the transmission direction mobile part MT→base station BS. Information having a bit length of 480 bits are transmitted according to the DECT standard in each of these time slots ZS. Of these 480 bits, 32 bits are transmitted as synchronization information in a sync field and 388 bits are transmitted as payload information in a D-field. The remaining 60 bits are transmitted as auxiliary information in a Z-field and as protective information in a "guard time" field. The 388 bits of the D-field transmitted as payload information are in turn subdivided into an A-field 64 bits long, a B-field 320 bits long and an "X-CRC" word 4 bits long. The 64 bit long A-field is composed of an 8 bit long data header, a 40 bit long data set with data for the C, Q, M, N, P channels and of a 16 bit long "A-CRC" word.

For setting up telecommunication connections between the base station or stations BS and the mobile part MT in the DECT systems according to FIGS. 1 through 5, the procedure described below is provided according to the DECT standard.

The base station BS (radio fixed part RFP) according to FIGS. 1 through 5 sends broadcast information via the DECT air interface at regular time intervals on simplex transmission paths, what are referred to as dummy bearers, these broadcast information being received by the mobile part MT (radio portable RPP) according to FIGS. 1 through 5 and serving the mobile part MT for synchronization and call setup with the base station. The broadcast information need not necessarily be transmitted on dummy bearers.

It is also possible that no dummy bearer is present because the base station is already maintaining at least one telecommunication connection, what is referred to as a traffic bearer, to another mobile part, and it then sends the necessary broadcast information thereon. In this case, the mobile part MT, RPP that would like to have a telecommunication connection to the base station BS, RFP receives the broadcast information—as in the transmission of the broadcast information on the dummy bearer.

The connection setup by the mobile part MT, RPP ensues according to the rules of channel selection (CETSI publication ETS 300175-5, Oct. 1992, Chapter 9 and, in particular, Chapter 9.3), in accord wherewith a new channel for the setup of a new connection is selected and a call request (CC-SETUP) is delivered to the base station BS, RFP.

The connection cleardown by the mobile part MT, RPP occurs in that the mobile part MT, RPP sends a connection release (CC-RELEASE) to the base station BS, RFP.

In the normal case (for example, no disrupted radio connection between the base station, BS, RFP and the mobile part MT, RPP; no disruption in the base station BS, RFP, etc., the connection request (CC-SETUP) and the connection release (CC-RELEASE) are confirmed by the base station BS, RFP within the framework of an ordinary handshaking procedure.

The connection setup and connection cleardown of the mobile part MT, RPP is monitored according to the DECT standard (see, ETS 300175-5, October 1992 (first edition) or, respectively, September 1996 (second edition), Chapter 9 and Annex A] by time counters (timers) so that the corresponding DECT-specific call control stake machines return into a defined condition in case of fault (for example DECT base station BS, RFP does not answer).

Figure 6:
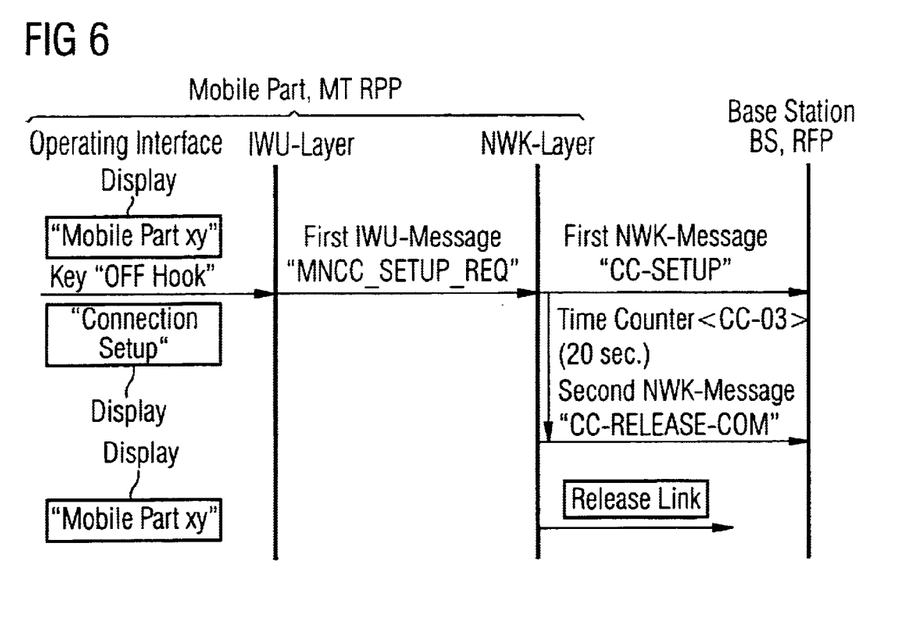
FIG. 6 is a message flow diagram for the connection setup.

FIG. 6 shows the message flow diagram for the connection setup, whereby the base station BS, RFP following a first Network Layer (NWK) message "CC-SETUP" sent from the mobile part MT, RPP for setting up the connection, does not confirm the connection setup within a time of 20 seconds available according to the criterion of a first time counter <CC-03> provided for the connection setup. The connection setup is monitored over this time of 20 seconds and, for example, is displayed as such on the display of the mobile part MT, RPP. When the indicated time expires without a reply of the base station, BS, RFP then the mobile part MT, RPP subsequently sends a second NWK message "CC-RELEASE COM" to the base station BS, RFP with which it automatically aborts the connection setup and consequently releases the physical channel (release link).

Before the mobile part MT, RPP sends the first NWK message "CC-SETUP" to the base station BS, RFP, the key "OFF HOOK" is actuated as a first operating procedure at the user interface of the mobile part MT, RPP for initiating the connection setup, whereupon a first IWU message "MNCC_SETUP_REQ" is transmitted from the IWU layer to the NWK layer according to the DECT protocol based on the ISO/OSI layer model.

The duration of twenty or, respectively thirty-six seconds of counting time for the time counter <CC-03>>, <CC-02>, however, is often considered too long by the user of the mobile part MT, RPP from his point of view. In the meantime, he could already respectively start another new connection setup.

Proceeding from FIG. 6 for the connection setup, it is known given Siemens GSM mobile radio telephones to prematurely abort a connection setup initiated at the side of the mobile part with the key "OFF HOOK" (green key) with the key "ON HOOK" (red key), i.e. before the expiration of the counting time of the corresponding time counter.

Figure 7:
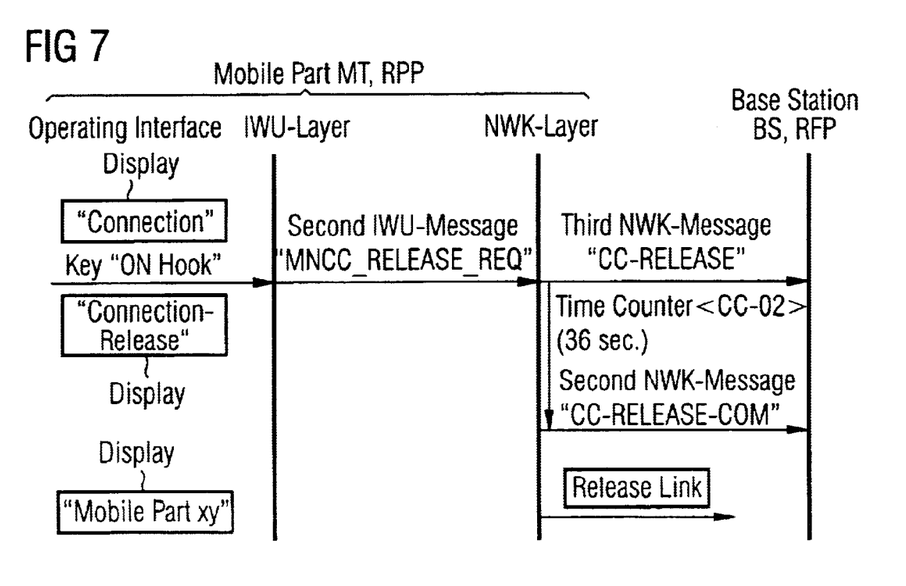
FIG. 7 is a flow diagram of operating procedures for the connection cleardown.

Comparable operating procedures for the connection cleardown according to FIG. 7 for a premature abort of a connection cleardown exist neither in mobile radio telephones (for example, according to the GSM standard) nor in cordless mobile parts (for example, according to the DECT standard). The reason for this is that a premature connection cleardown on the basis of the respective standard has not been allowed, at least yet.

SUMMARY OF THE INVENTION

The object underlying the invention is comprised in triggering the user-controlled release of wireless telecommunication connections in wireless telecommunication systems, particular DECT systems, in a way that is user-friendly and acceptable.

This object is achieved by a method for user-controlled release of wireless telecommunication connections in wireless telecommunication systems, particularly DECT systems, whereby wireless telecommunication connections between first telecommunication devices and second telecommunication devices of the telecommunication systems are set up by first operating procedures at user interfaces of the first telecommunication devices and are released by second operating procedures at the user interfaces of the first telecommunication devices, whereby the first operating procedures trigger predetermined message flows from the first telecommunication devices to the second telecommunication devices that signal the connection setup and the second operating procedures trigger predetermined message flows from the first telecommunication devices to the second telecommunication devices that signal the connection release, the wireless telecommunication connections being released or, respectively, aborted unconditionally—without confirmation by the second telecommunication devices or before the expiration of time counters monitoring the connection release—in two stages by the second operating procedures.

The idea underlying the invention is comprised therein that connections once setup between telecommunication devices connectible by wireless telecommunication in wireless telecommunication systems of the species initially outlined—for example, DECT mobile parts and DECT base stations in DECT systems—are unconditionally released or, respectively, aborted in two stages by operating procedures (second operating procedures) differing from operating procedures (first operating procedures) for the connection setup.

According to a further development, it is advantageous that keys are actuated as the operating procedures.

According to yet another development, it is advantageous that voice commands are input as operating procedures.

In an embodiment of the invention it is thereby advantageous that the key "OFF HOOK" is actuated as first operating procedure.

According to a variation of the invention, it is thereby advantageous that the key "ON HOOK" is actuated twice as secondary operating procedure.

The unconditional release or, respectively, abort of the connections between the telecommunication devices connectible by wireless telecommunication in the wireless telecommunication systems can fundamentally be implemented independently of whether the wireless telecommunication between the telecommunication devices is disturbed or not (normal case mentioned above). However, the method is particularly meaningful when the connections for the release and, additionally, both for the setup as well as for the release are disturbed.

Further advantageous developments of the invention are included that first voice commands to "set up connection" are input in the first operating procedures, and that second voice commands to "release connection" and third voice commands to "abort connection" are input in the second operating procedures.

According to one embodiment of the invention, DECT systems are employed as the telecommunication systems, the telecommunication connections are setup and unconditionally released or, respectively, aborted according to the DECT air interface protocol, DECT mobile parts or DECT network termination modules with allocated wire-bound terminal devices comprising user interfaces are employed as the first telecommunication devices, and DECT base stations are employed as the second telecommunication devices. In another embodiment, GSM systems are employed as the telecommunication systems, the telecommunication connections are setup and unconditionally released or, respectively, aborted according to the GSM air interface protocol, GSM mobile parts are employed as the first telecommunication devices, and GSM base stations with allocated, central switching devices are employed as the second telecommunication devices. In a further embodiment, hybrid systems with respect to the CDMA/FDMA/TDMA multiple access methods are employed as the telecommunication systems, the telecommunication connections are setup and unconditionally released or, respectively, aborted according to a hybrid air interface protocol, hybrid mobile parts with respect to the CDMA/FDMA/TDMA multiple access methods or hybrid network termination assemblies with respect to the CDMA/FDMA/TDMA multiple access methods with allocated, wire-bound terminal equipment comprising user interfaces are employed as the first telecommunication devices, and hybrid base stations with respect to the CDMA/FDMA/TDMA multiple access methods are employed as the second telecommunication devices.

BRIEF DESCRIPTION OF THE DRAWINGS

An exemplary embodiment of the invention is explained with reference to FIGS. 8 and 9.

Figure 8:
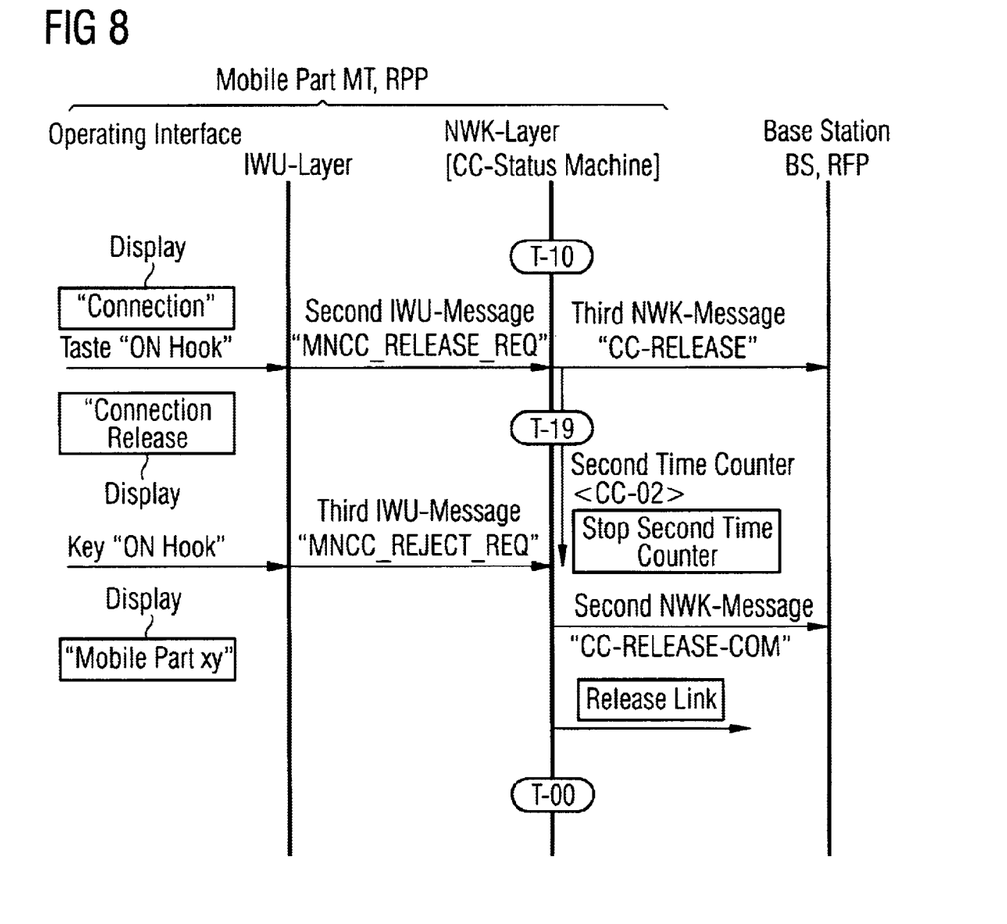
FIG. 8 is a message flow diagram for an unconditional connection release or, respectively, for a connection abort for an existing connection.

Proceeding from FIGS. 6 and 7 and in conjunction with the ETSI publication ETS 300175-5, October 1992, Chapter 9, FIGS. 3 and 4 as well as Annex B.1, FIG. 8 shows a message flow diagram for an unconditional connection release or, respectively, for a connection abort, whereby an existing connection, traditionally set up by the actuation of the "OFF HOOK" key as first operating procedure, potentially preferably displayed on the user interface (for example display) of the mobile part MT, RPP with "connection", is unconditionally released or, respectively, aborted in the CC condition T-10 user-controlled with a second operating procedure either by actuating the key "ON HOOK" twice in immediate succession or by actuation of the key "ON HOOK" twice in succession with a predetermined time delay that is significantly shorter than the time delay produced by the second time counter <CC-02> than.

After the known, first actuation of the key "ON HOOK"—first stage of the second operating procedure—, the second IWU message "MNCC_RELEASE_REQ" is transmitted in the mobile part MT RPP from the IWU layer to the NWK layer according to the DECT protocol based on the ISO/OSI layer model. On the NWK level, this triggers the transmission of the third NWK message "CC-RELEASE" to the base station BS, RFP. The CC status machine proceeds into the CC status T-19 as a result thereof. As warranted, "connection setup" is preferably displayed at the user interface (for example display) of the mobile part MT, RPP.

When—as already mentioned above, the key "ON HOOK" is subsequently actuated a second time—second stage of the second operating procedure—either immediately thereafter or with a predetermined time delay, a third IWU message "MNCC_REJECT_REQ" is transmitted in the mobile part MT, RPP from the IWU layer to the NWK layer according to the DECT protocol based on the ISO/OSI layer model. As a result thereof, the second time counter <CC-02> on the NWK level is stopped by the mobile part MT, RPP and reset or, respectively, the time counting event is aborted and the time counter <CC-02> is reset, and the second NWK message "CC-RELEASE-COM" is transmitted to the base station BS, RFP, as a result whereof it automatically aborts the connection setup and, as a consequence thereof, releases the physical channel (release link).

The CC status machine subsequently switches into the status T-00. As warranted, "mobile part xy" is displayed on the user interface (for example, display) of the mobile part.

Alternatively, to the key actuations that have been addressed, it is also possible given a correspondingly fashioned mobile part (voice-controlled user interface) to implement the unconditional connection release or, respectively, the connection abort voice-controlled (for example, with voice commands "release connection" and "abort connection").

Instead of the second actuation of the key "ON HOOK", it is also possible to actuate some other key.

Figure 9:
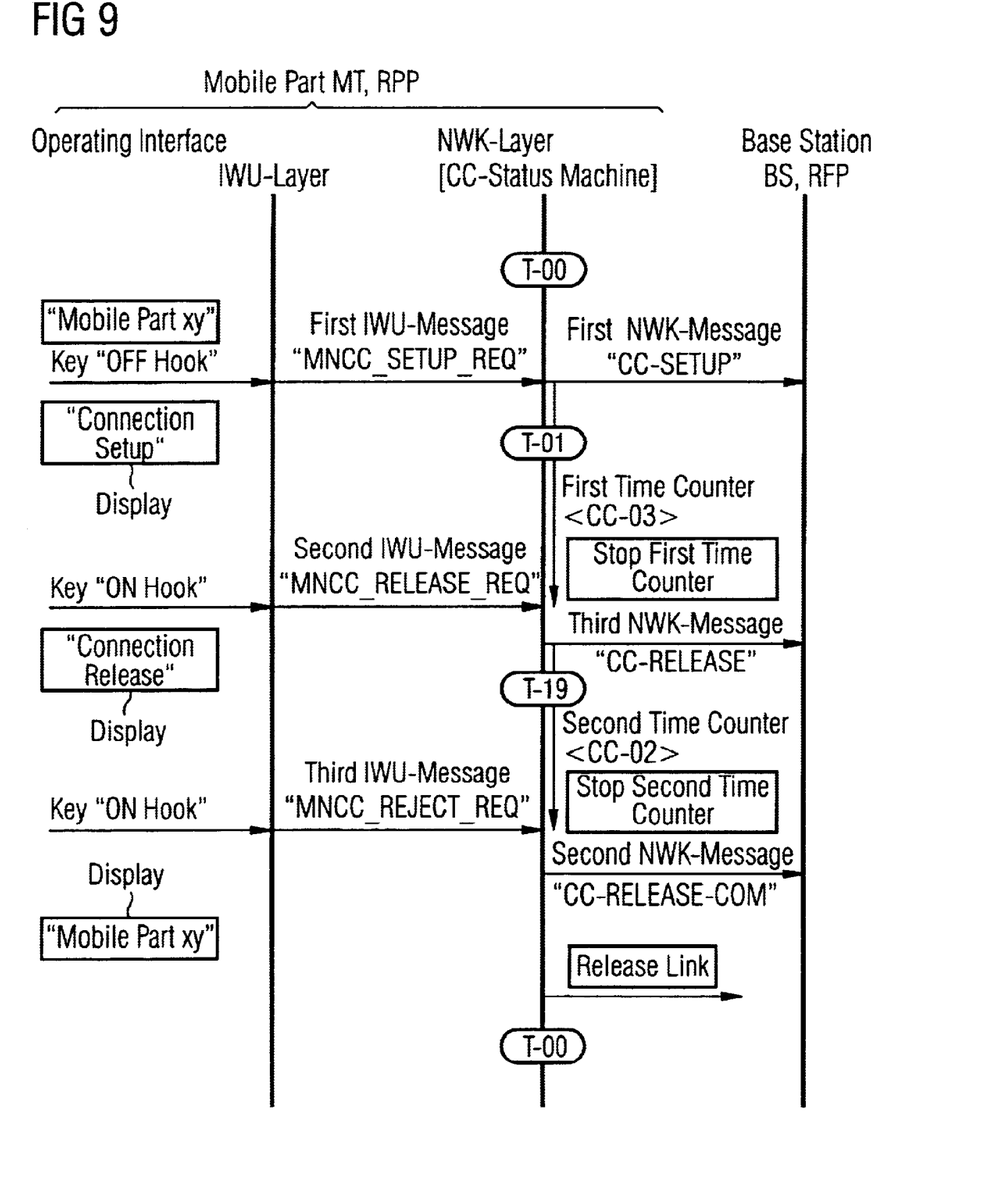
FIG. 9 is a message flow diagram for an unconditional connection release or, respectively, for a connection abort after a previously initiated but not yet accomplished connection setup.

Proceeding from FIGS. 6 and 7 and in conjunction with the ETSI publication ETS 300175-5, October 1992, Chapter 9, FIGS. 3 and 4 as well as Annex B.1, FIG. 9 shows a message flow diagram for an unconditional connection release or, respectively, for a connection abort following a connection setup that was previously initiated by the first operating procedure—actuation of the "OFF HOOK" key according to FIG. 6—but not yet completed, whereby "mobile part xy" is potentially displayed on the user interface (for example display) of the mobile part MT, RPP before the connection setup and the CC status machine is in the status T-00.

When, according to FIG. 9, the connection setup is initiated user-controlled in the traditional way by the key "OFF HOOK" as the first operating procedure according to FIG. 6, then the first IWU message "MNCC_SETUP_REQ" is transmitted in the mobile part MT RPP from the IWU layer to the NWK layer according to the DECT protocol based on the ISO/OSI layer model. On the NWK level, this triggers the transmission of the first NWK message "CC-SETUP" to the base station BS, RFP. The CC status machine switches into the CC status T-01 as a result thereof. As warranted, "connection setup" is preferably displayed on the user interface (for example display) of the mobile part MT, RPP.

When, following thereupon, either the key "ON HOOK" is actuated twice in immediate succession or the key "ON HOOK" is actuated twice in succession with a predetermined time delay that is significantly shorter than the time delay produced by the second time counter <CC-02>, being actuated user controlled by the second operating procedure either immediately thereafter or with a predetermined time delay that is significantly shorter than the time delay produced by the first time counter <CC-03>, then the connection is unconditionally released or, respectively, aborted.

When—according to FIG. 9 and as already mentioned above—the key "ON HOOK" is actuated a first time—the first stage of the second operating procedure—either immediately thereafter or with the predetermined time delay, then the second IWU message "MNCC_RELEASE_REQ" is transmitted from the IWU layer to the NWK layer according to the ISO/OSI layer model in the mobile part MT, RPP according to the DECT protocol. This results therein on NWK level that the first time counter <CC-03> is stopped and reset or, respectively, the time counting procedure is aborted and the time counter <CC-03> is reset and the third NWK message "CC-RELEASE" is transmitted to the base station BS, RFP. As a result thereof, the CC status machine switches into the CC status T-19. As warranted, "connection release" is preferably displayed at the user interface (for example, display) of the mobile part MT,RPP.

When—as already mentioned above—the key "ON HOOK" is actuated a second time thereafter—the second stage of the second operating procedure—either immediately thereafter or with a predetermined time delay, a third IWU message "MNCC_REJECT_REQ" is transmitted in the mobile part MT, RPP from the IWU layer to the NWK layer according to the DECT protocol based on the ISO/OSI layer model.

As a result thereof, the second time counter <CC-02> is stopped by the mobile part MT, RPP on the NWK level and is reset or, respectively, the time counting event is aborted and the time counter <CC-02> is reset, and the second NWK message "CC-RELEASE-COM" is transmitted to the base station BS, RFP, as a result whereof it automatically aborts the connection release and, as a result thereof, releases the physical channel (release link). The CC status machine subsequently switches into the status T-00, and "mobile part xy" is potentially displayed on the user interface (for example display) of the mobile part MT, RPP.

Alternatively to the key actuations that have been addressed, it is again possible as well given a correspondingly fashioned mobile part (voice-controlled user interface) to implement the connection setup as well as the unconditional connection release or, respectively, the connection abort voice-controlled (for example, with voice commands "setup connection", "abort connection" and "release connection").

Instead of the second actuation of the key "ON HOOK", it is also again possible to actuate some other key.

Although other modifications and changes may be suggested by those skilled in the art, it is the intention of the inventors to embody within the patent warranted hereon all changes and modifications as reasonably and properly come within the scope of their contribution to the art.

We claim:

1. A method for user-controlled release of wireless telecommunication connections in wireless telecommunication systems, comprising the steps of:

setting up wireless telecommunication connections between first telecommunication devices and second telecommunication devices of the telecommunication systems by first operating procedures at user interfaces of the first telecommunication devices and releasing the wireless telecommunication connection by second operating procedures at the user interfaces of the first telecommunication devices, the first operating procedures trigger predetermined message flows from the first telecommunication devices to the second telecommunication devices that signal the connection setup and the second operating procedures trigger predetermined message flows from the first telecommunication devices to the second telecommunication devices that signal the connection release, releasing the wireless telecommunication connections unconditionally in two stages by the second operating procedures without confirmation by the second telecommunication devices or before the expiration of time counters monitoring the connection release.

2. A method according to claim 1, wherein the first and second operating procedures comprise actuation of keys.

3. A method according to claim 2, further comprising the step of: activating "OFF HOOK" keys in the first operating procedures.

4. A method according to claim 2, further comprising the step of: actuating "ON HOOK" keys twice in succession in the second operating procedures.

5. A method according to claim 1, wherein the first and second operating procedures comprise inputs of voice commands.

6. A method according to claim 5, further comprising the step of: inputting first voice commands "set up connection" in the first operating procedures.

7. A method according to claim 6, further comprising:
inputting second voice commands "release connection" and inputting third voice commands "abort connection" in the second operating procedures.

8. A method according to claim 1, further comprising the step of:
using DECT systems as the telecommunication systems, the telecommunication connections being setup and unconditionally released according to the DECT air interface protocol, DECT mobile parts or DECT network termination modules with allocated wire-bound terminal devices user interfaces being employed as the first telecommunication devices, and DECT base stations being employed as the second telecommunications devices.

9. A method according to claim 8, wherein the telecommunication connections are unconditionally released according to the DECT air interface protocol in that the DECT mobile parts or DECT network termination assemblies with allocated, wire-bound terminal devices include user interfaces transmit first Network Layer (NWK) messages "CC-RELEASE" and second messages "CC-RELEASE-COM" to the DECT base stations initiated by the second operating procedures.

10. A method according to claim 8, further comprising the step of:
initiating the telecommunication connection releases by the first NWK messages "CC-RELEASE".

11. A method according to claim 8, further comprising the step of:
a initiating the telecommunication connection setups by third NWK messages "CC-SETUP".

12. A method according to claim 1, further comprising the step of: using GSM systems as the telecommunication systems, the telecommunication connections being setup and unconditionally released according to the GSM air interface protocol, GSM mobile parts being employed as the first telecommunication devices, and GSM base stations with allocated, central switching devices being employed as the second telecommunication devices.

13. A method according to claim 1, further comprising the step of:
using hybrid systems with respect to the CDMA/FDMA/TDMA multiple access methods are employed as the telecommunication systems, the telecommunication connections being setup and unconditionally released according to a hybrid air interface protocol, hybrid mobile parts with respect to the CDMA/FDMA/TDMA multiple access methods or hybrid network termination assemblies with respect to the CDMA/FDMA/TDMA multiple access methods with allocated, wire-bound terminal equipment having user interfaces being employed as the first telecommunication devices, and hybrid base stations with respect to the CDMA/FDMA/TDMA multiple access methods being employed as the second telecommunication devices.

14. A method according to claim 1, further comprising the step of:
initiating the telecommunication connection releases from the first telecommunication devices given disturbed telecommunication connections between the first telecommunication devices and the second telecommunication devices.

15. A method according to claim 1, further comprising the step of:
initiating the telecommunication connection setups from the first telecommunication devices given disturbed telecommunication connections between the first telecommunication devices and the second telecommunication devices.

* * * * *